United States Patent
Haritaoglu et al.

(10) Patent No.: US 11,785,268 B1
(45) Date of Patent: *Oct. 10, 2023

(54) SYSTEM FOR MANAGING VIDEO PLAYBACK USING A SERVER GENERATED MANIFEST/PLAYLIST

(71) Applicant: Google LLC, Mountain View, CA (US)

(72) Inventors: Ismail R. Haritaoglu, Palo Alto, CA (US); Oztan Harmanci, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/013,370

(22) Filed: Sep. 4, 2020

Related U.S. Application Data

(63) Continuation of application No. 15/590,955, filed on May 9, 2017, now Pat. No. 10,771,824.

(60) Provisional application No. 62/334,157, filed on May 10, 2016.

(51) Int. Cl.
 *H04N 7/173* (2011.01)
 *H04N 21/234* (2011.01)
 *H04N 21/232* (2011.01)
 *H04N 21/2387* (2011.01)

(52) U.S. Cl.
 CPC ..... *H04N 21/23424* (2013.01); *H04N 21/232* (2013.01); *H04N 21/2387* (2013.01)

(58) Field of Classification Search
 CPC ........... H04N 21/23424; H04N 21/232; H04N 21/2387
 See application file for complete search history.

(56) References Cited

U.S. PATENT DOCUMENTS

| | | | |
|---|---|---|---|
| 5,442,744 | A | 8/1995 | Piech et al. |
| 5,513,260 | A | 4/1996 | Ryan |
| 5,577,135 | A | 11/1996 | Grajski et al. |
| 5,659,613 | A | 8/1997 | Copeland et al. |
| 5,668,603 | A | 9/1997 | Copeland |
| 5,721,788 | A | 2/1998 | Powell et al. |
| 5,883,959 | A | 3/1999 | Kori |
| 5,917,943 | A | 6/1999 | Washizawa |
| 6,018,374 | A | 1/2000 | Wrobleski |
| 6,026,189 | A | 2/2000 | Greenspan |
| 6,173,275 | B1 | 1/2001 | Caid et al. |

(Continued)

FOREIGN PATENT DOCUMENTS

| | | |
|---|---|---|
| CN | 101325687 A | 12/2008 |
| CN | 101356820 A | 1/2009 |

(Continued)

OTHER PUBLICATIONS

D. G. Lowe, "Object Recognition from Local Scale-Invariant Features", in International Conference on Computer Vision, vol. 2, 1999, pp. 1-8.

(Continued)

*Primary Examiner* — Annan Q Shang
(74) *Attorney, Agent, or Firm* — Lowenstein Sandler LLP

(57) ABSTRACT

An apparatus and method for managing video playback for users during video streaming is disclosed. In one aspect, a server may be used to generate manifest files and updates to video players requesting video content. In addition, the manifest files and updates may be provided unique to each video player.

20 Claims, 3 Drawing Sheets

(56) References Cited

U.S. PATENT DOCUMENTS

| | | | |
|---|---|---|---|
| 6,373,960 B1 | 4/2002 | Conover et al. | |
| 6,381,367 B1 | 4/2002 | Ryan | |
| 6,404,925 B1 | 6/2002 | Foote et al. | |
| 6,438,275 B1 | 8/2002 | Martins et al. | |
| 6,539,395 B1 | 3/2003 | Gjerdingen et al. | |
| 6,711,293 B1 | 3/2004 | Lowe | |
| 6,774,917 B1 | 8/2004 | Foote et al. | |
| 6,785,815 B1 | 8/2004 | Serret-Avila et al. | |
| 6,937,766 B1 | 8/2005 | Wilf et al. | |
| 6,975,746 B2 | 12/2005 | Davis et al. | |
| 6,975,755 B1 | 12/2005 | Baumberg | |
| 7,043,019 B2 | 5/2006 | Tehranchi et al. | |
| 7,055,169 B2 | 5/2006 | Delpuch et al. | |
| 7,167,574 B2 | 1/2007 | Kim | |
| 7,177,470 B2 | 2/2007 | Jasinschi et al. | |
| 7,185,201 B2 | 2/2007 | Rhoads et al. | |
| 7,218,754 B2 | 5/2007 | Schumann et al. | |
| 7,272,240 B2 | 9/2007 | Goldberg et al. | |
| 7,298,930 B1 | 11/2007 | Erol et al. | |
| 7,325,013 B2 | 1/2008 | Caruso | |
| 7,421,376 B1 | 9/2008 | Caruso et al. | |
| 7,650,361 B1 | 1/2010 | Wong et al. | |
| 8,099,508 B2 | 1/2012 | Mao et al. | |
| 8,160,366 B2 | 4/2012 | Nakamura et al. | |
| 8,200,021 B2 | 6/2012 | Iwamoto et al. | |
| 8,234,350 B1 | 7/2012 | Gu et al. | |
| 8,515,212 B1 | 8/2013 | Bengio et al. | |
| 8,515,241 B2 | 8/2013 | Forsyth et al. | |
| 8,607,283 B2 | 12/2013 | Civanlar et al. | |
| 8,677,428 B2 | 3/2014 | Lewis et al. | |
| 8,887,215 B2 | 11/2014 | Fisher | |
| 8,943,215 B2 | 1/2015 | Patten et al. | |
| 9,015,151 B1 | 4/2015 | Margulis et al. | |
| 9,066,115 B1 | 6/2015 | Cherry et al. | |
| 9,066,138 B1 | 6/2015 | Kraiman et al. | |
| 9,084,030 B1 | 7/2015 | Nijim et al. | |
| 9,167,278 B2 | 10/2015 | Sinha et al. | |
| 9,448,619 B1 | 9/2016 | Kerns | |
| 9,491,499 B2 | 11/2016 | Wagenaar et al. | |
| 9,552,356 B1* | 1/2017 | Edwards | G06F 30/00 |
| 9,613,042 B1 | 4/2017 | Joseph et al. | |
| 9,654,817 B2 | 5/2017 | Li et al. | |
| 10,104,137 B2 | 10/2018 | Salomons | |
| 10,148,716 B1 | 12/2018 | Joseph et al. | |
| 10,306,208 B2 | 5/2019 | Hosea | |
| 10,595,054 B2 | 3/2020 | Turgut et al. | |
| 10,785,508 B2 | 9/2020 | Haritaoglu et al. | |
| 2002/0159641 A1 | 10/2002 | Whitney et al. | |
| 2002/0178447 A1 | 11/2002 | Plotnick et al. | |
| 2003/0005454 A1 | 1/2003 | Rodriguez et al. | |
| 2003/0033347 A1 | 2/2003 | Bolle et al. | |
| 2003/0045954 A1 | 3/2003 | Weare et al. | |
| 2003/0151621 A1 | 8/2003 | McEvilly et al. | |
| 2003/0195883 A1 | 10/2003 | Mojsilovic et al. | |
| 2003/0229900 A1 | 12/2003 | Reisman | |
| 2004/0022447 A1 | 2/2004 | Mukhopadhyay et al. | |
| 2004/0085339 A1 | 5/2004 | Divakaran et al. | |
| 2004/0221237 A1 | 11/2004 | Foote et al. | |
| 2004/0260786 A1 | 12/2004 | Barile | |
| 2005/0041159 A1 | 2/2005 | Nakamura et al. | |
| 2005/0125368 A1 | 6/2005 | Akahori | |
| 2005/0155063 A1* | 7/2005 | Bayrakeri | H04N 21/4348 348/E7.071 |
| 2005/0251532 A1 | 11/2005 | Radhakrishnan et al. | |
| 2005/0262245 A1 | 11/2005 | Menon et al. | |
| 2005/0278736 A1 | 12/2005 | Steelberg et al. | |
| 2005/0289347 A1 | 12/2005 | Ovadia | |
| 2006/0029253 A1 | 2/2006 | Pace | |
| 2006/0101060 A1 | 5/2006 | Li et al. | |
| 2006/0111801 A1 | 5/2006 | Weare et al. | |
| 2006/0271973 A1 | 11/2006 | Jerding et al. | |
| 2006/0279628 A1 | 12/2006 | Fleming | |
| 2006/0291690 A1 | 12/2006 | Roberts | |
| 2007/0025606 A1 | 2/2007 | Gholap et al. | |
| 2007/0121997 A1 | 5/2007 | Harmanci | |
| 2007/0128899 A1 | 6/2007 | Mayer | |
| 2007/0143493 A1* | 6/2007 | Mullig | G06F 16/40 709/232 |
| 2007/0157231 A1 | 7/2007 | Eldering et al. | |
| 2007/0171580 A1* | 7/2007 | Nishimura | H01F 41/303 257/E43.004 |
| 2007/0180466 A1* | 8/2007 | Ando | H04N 5/775 348/E5.007 |
| 2007/0217676 A1 | 9/2007 | Grauman et al. | |
| 2007/0253594 A1 | 11/2007 | Lu et al. | |
| 2007/0282898 A1 | 12/2007 | Stark et al. | |
| 2008/0027931 A1 | 1/2008 | Lu et al. | |
| 2008/0040807 A1 | 2/2008 | Lu et al. | |
| 2008/0123976 A1 | 5/2008 | Coombs et al. | |
| 2008/0166057 A1 | 7/2008 | Nakajima | |
| 2008/0186413 A1 | 8/2008 | Someya et al. | |
| 2008/0271080 A1 | 10/2008 | Gossweiler et al. | |
| 2009/0074235 A1 | 3/2009 | Lahr et al. | |
| 2009/0089838 A1 | 4/2009 | Pino, Jr. et al. | |
| 2009/0113512 A1 | 4/2009 | Collet et al. | |
| 2009/0193473 A1 | 7/2009 | Moon et al. | |
| 2009/0204901 A1 | 8/2009 | Dharmaji et al. | |
| 2009/0324026 A1 | 12/2009 | Kletter | |
| 2010/0138865 A1 | 6/2010 | Rai et al. | |
| 2010/0162330 A1 | 6/2010 | Herlein et al. | |
| 2010/0299438 A1 | 11/2010 | Zimmerman et al. | |
| 2011/0078551 A1 | 3/2011 | Zhang et al. | |
| 2011/0191692 A1 | 8/2011 | Walsh et al. | |
| 2011/0219035 A1 | 9/2011 | Korsunsky et al. | |
| 2011/0314493 A1 | 12/2011 | Lemire et al. | |
| 2012/0089910 A1 | 4/2012 | Cassidy | |
| 2012/0159337 A1 | 6/2012 | Travilla et al. | |
| 2012/0166289 A1 | 6/2012 | Gadoury | |
| 2012/0173753 A1 | 7/2012 | Moorthy | |
| 2012/0216121 A1 | 8/2012 | Lin et al. | |
| 2012/0240176 A1 | 9/2012 | Ma et al. | |
| 2012/0275597 A1 | 11/2012 | Knox et al. | |
| 2012/0278725 A1 | 11/2012 | Gordon | |
| 2013/0060911 A1 | 3/2013 | Nagaraj et al. | |
| 2013/0163758 A1 | 6/2013 | Swaminathan et al. | |
| 2013/0195204 A1 | 8/2013 | Reznik et al. | |
| 2013/0219178 A1 | 8/2013 | Xiques et al. | |
| 2013/0219425 A1 | 8/2013 | Swartz | |
| 2013/0227074 A1 | 8/2013 | Odlund | |
| 2013/0291002 A1 | 10/2013 | Rothschild et al. | |
| 2013/0311780 A1 | 11/2013 | Besehanic | |
| 2014/0029922 A1 | 1/2014 | Goldfeder et al. | |
| 2014/0095890 A1 | 4/2014 | Mangalore et al. | |
| 2014/0115060 A1 | 4/2014 | Kim et al. | |
| 2014/0136661 A1 | 5/2014 | Handa | |
| 2014/0173660 A1 | 6/2014 | Correa et al. | |
| 2014/0176299 A1 | 6/2014 | Kumar et al. | |
| 2014/0181656 A1 | 6/2014 | Kumar et al. | |
| 2014/0201334 A1 | 7/2014 | Wang et al. | |
| 2014/0229970 A1 | 8/2014 | Besehanic | |
| 2014/0259051 A1 | 9/2014 | Strein et al. | |
| 2014/0280781 A1 | 9/2014 | Gregotski | |
| 2014/0282772 A1 | 9/2014 | Chen et al. | |
| 2014/0337904 A1* | 11/2014 | Panje | H04N 21/845 725/90 |
| 2015/0058709 A1 | 2/2015 | Zaletel | |
| 2015/0074232 A1 | 3/2015 | Phillips et al. | |
| 2015/0113021 A1 | 4/2015 | Martin | |
| 2015/0172342 A1 | 6/2015 | Yin | |
| 2015/0208103 A1 | 7/2015 | Guntur et al. | |
| 2015/0312299 A1 | 10/2015 | Chen | |
| 2015/0346832 A1 | 12/2015 | Cole et al. | |
| 2015/0365622 A1 | 12/2015 | Ushiyama | |
| 2015/0365725 A1* | 12/2015 | Belyaev | H04N 21/6175 725/46 |
| 2015/0382042 A1 | 12/2015 | Wagenaar et al. | |
| 2016/0065946 A1 | 3/2016 | Cole et al. | |
| 2016/0080470 A1 | 3/2016 | Shanson | |
| 2016/0080810 A1 | 3/2016 | Dutta et al. | |
| 2016/0100224 A1 | 4/2016 | Nordstrom | |
| 2016/0127260 A1 | 5/2016 | Gordon | |
| 2016/0127440 A1 | 5/2016 | Gordon | |
| 2016/0134910 A1 | 5/2016 | Davis et al. | |
| 2016/0149699 A1 | 5/2016 | Gauda | |

(56) References Cited

U.S. PATENT DOCUMENTS

| | | |
|---|---|---|
| 2016/0173961 A1 | 6/2016 | Coan et al. |
| 2016/0198202 A1 | 7/2016 | Van Brandenburg et al. |
| 2016/0224799 A1 | 8/2016 | Uzun et al. |
| 2016/0227228 A1 | 8/2016 | Pomeroy et al. |
| 2016/0227279 A1 | 8/2016 | Fang et al. |
| 2016/0292728 A1 | 10/2016 | Kang |
| 2016/0316233 A1 | 10/2016 | Ghadi et al. |
| 2016/0328396 A1 | 11/2016 | Rajapakse |
| 2016/0337704 A1 | 11/2016 | Binder et al. |
| 2017/0024098 A1 | 1/2017 | Doherty |
| 2017/0064400 A1 | 3/2017 | Riegel et al. |
| 2017/0070758 A1 | 3/2017 | Phillips et al. |
| 2017/0085933 A1 | 3/2017 | Czeck, Jr. et al. |
| 2017/0148057 A1 | 5/2017 | Parameshwar |
| 2017/0150190 A1 | 5/2017 | Tarbox et al. |
| 2017/0155973 A1 | 6/2017 | Muller |
| 2017/0171580 A1 | 6/2017 | Hirsch et al. |
| 2017/0280181 A1 | 9/2017 | Ramaley |
| 2017/0302753 A1 | 10/2017 | Larumbe et al. |
| 2017/0308681 A1 | 10/2017 | Gould et al. |
| 2017/0353516 A1 | 12/2017 | Gordon |
| 2018/0063594 A1 | 3/2018 | Alexander et al. |
| 2018/0139507 A1 | 5/2018 | Toksoz et al. |

FOREIGN PATENT DOCUMENTS

| | | |
|---|---|---|
| CN | 101589617 A | 11/2009 |
| CN | 101689184 A | 3/2010 |
| CN | 103155571 A | 6/2013 |
| CN | 103491457 A | 1/2014 |
| JP | 3916025 B2 | 5/2007 |
| JP | 4150951 B2 | 9/2008 |
| WO | 0115451 A1 | 3/2001 |
| WO | 2006122320 | 11/2006 |
| WO | 2007148290 | 12/2007 |
| WO | 2015148513 A1 | 10/2015 |

OTHER PUBLICATIONS

K. Mihcak and R. Venkatesan, "Blind Image Watermarking Via Derivation and Quantization of Robust Semi-Global Statistics", in IEEE International Conference on Acoustics, Speech and Signal Processing, 2002, (4 pages).

T. Lindeberg, "Feature Detection with Automatic Scale Selection", International Journal of Computer Vision, vol. 30, No. 2, 1998, pp. 1-51.

A. Andoni and P. Indyk, "Near-Optimal Hashing Algorithms for Approximate Nearest Neighbor in High Dimensions", in Proceedings of the Symposium on Foundations of Computer Science, Jan. 2006, 10 pages.

A. Joly, O. Buisson and C. Frelicot, "Content-based Copy Retrieval using Distortion-based Probabilistic Similarity Search", IEEE Transactions on Multimedia, vol. 9, No. 2, p. 1-14, Feb. 2007.

J. Matas, O. Chum, M. Urban, T. Pajdla, "Robust Wide Baseline Stereo from Maximally Stable Extremal Regions", in British Machine Vision Conference., 2002, pp. 384-393.

K. Mikolajczyk and C. Schmid, "Indexing based on scale invariant interest points", in Proc. ICCV, 2001, 7 pages.

Chinese Patent Application No. 201780011326.6, Office Action dated Mar. 9, 2020, 6 pages.

Chinese Patent Application No. 201780011328.5, Office Action dated Mar. 9, 2020, 8 pages.

Chinese Patent Application No. 201780011291.6, Office Action dated Sep. 29, 2021, 22 pages.

Partial European search report for European Patent Application No. 22174193.7, dated Sep. 9, 2022, 16 pages.

Pantos R: "HTTP Live Streaming Draft-Pantos-HTTP-Livestreaming-00", Internet Citation, May 1, 2009 (May 1, 2009), pp. 1-17, XP002606603.

Summons to Attend Oral Proceedings for European Patent Application No. 17725050.3, dated May 12, 2023, 9 pages.

China Notification on the Grant of Patent Right for Invention for Application No. 202110187393.1, dated Apr. 21, 2023, 7 pages.

\* cited by examiner

```
#EXTM3U
#EXT-X-STREAM-INF:PROGRAM-ID=1,BANDWIDTH=1326000
http://12.34.56.789/server/play/directory/1326000/prog.m3u8
#EXT-X-STREAM-INF:PROGRAM-ID=1,BANDWIDTH=826000
http://12.34.56.789/server/play/directory/826000/prog.m3u8
#EXT-X-STREAM-INF:PROGRAM-ID=1,BANDWIDTH=1926000
http://12.34.56.789/server/play/directory/1926000/prog.m3u8
#EXT-X-STREAM-INF:PROGRAM-ID=1,BANDWIDTH=526000
http://12.34.56.789/server/play/directory/526000/prog.m3u8
```

FIG. 4

```
#EXTM3U
#EXT-X-TARGETDURATION:10
#EXT-X-VERSION:5
#EXT-X-MEDIA-SEQUENCE:1
#EXT-X-KEY:METHOD=SAMPLE-AES,URI="http://www.server.com/keys/ckey/kuxeFdrW8knwGPJ7zDIJ6Q==?anvack=nbcu_n
bcd_watchvod_ios_qa_c23d2809ee27249f2a757537da68d17d",IV=0xE0F48617C65F9D00ACC4B47D0EDE94B5
#EXTINF:12.512,
http://www.videolocation.com/2288/15/04/24/2861607/227C1D636AE412B0A9CD90ECB9B899BD6A7631282DBF7E-1.ts
#EXT-X-KEY:METHOD=SAMPLE-AES,URI="http://www.server.com/keys/ckey/kuxeFdrW8knwGPJ7zDIJ6Q==?anvack=nbcu_nbcd_wa
tchvod_ios_qa_c23d2809ee27249f2a757537da68d17d",IV=0x24BCA9ACCEFA864BFEC75CBED36D47C8
#EXTINF:12.512,
http://www.videolocation.com/2288/15/04/24/2861607/227C1D636AE412B0A9CD90ECB9B899BD6A7631282DBF7E-2.ts
#EXT-X-KEY:METHOD=SAMPLE-AES,URI="http://www.server.com/keys/ckey/kuxeFdrW8knwGPJ7zDIJ6Q==?anvack=nbcu_nbcd_wa
tchvod_ios_qa_c23d2809ee27249f2a757537da68d17d",IV=0x6C29CA3D305C63ACEBB7A06EBE3573F7
#EXTINF:12.513,
http://www.videolocation.com/2288/15/04/24/2861607/227C1D636AE412B0A9CD90ECB9B899BD6A7631282DBF7E-3.ts
#EXT-X-KEY:METHOD=SAMPLE-AES,URI="http://www.server.com/keys/ckeys/kuxeFdrW8knwGPJ7zDIJ6Q==?anvack=nbcu_nbcd_wa
tchvod_ios_qa_c23d2809ee27249f2a757537da68d17d",IV=0xC8BDB892FDE40BD0C167C3F10B5D8699
#EXTINF:12.512,
http://www.videolocation.com/2288/15/04/24/2861607/227C1D636AE412B0A9CD90ECB9B899BD6A7631282DBF7E-4.ts
#EXT-X-KEY:METHOD=SAMPLE-AES,URI="http://www.server.com/keys/ckey/kuxeFdrW8knwGPJ7zDIJ6Q==?anvack=nbcu_nbcd_wa
tchvod_ios_qa_c23d2809ee27249f2a757537da68d17d",IV=0x3F9FCC1E55D85CFE32C18BA73992181D
#EXTINF:12.513,
http://www.videolocation.com/2288/15/04/24/2861607/227C1D636AE412B0A9CD90ECB9B899BD6A7631282DBF7E-5.ts
```

FIG. 5

000
SYSTEM FOR MANAGING VIDEO PLAYBACK USING A SERVER GENERATED MANIFEST/PLAYLIST

CROSS-REFERENCE TO RELATED APPLICATIONS

This application is a continuation application of co-pending U.S. patent application Ser. No. 15/590,955, filed May 9, 2017, which claims priority to U.S. Provisional Patent Application No. 62/334,157, filed on May 10, 2016, which are herein incorporated by reference.

BACKGROUND

The subject matter disclosed herein relates to a method for managing video playback for users during video streaming. More specifically, a method and apparatus for using a server to generate per-user manifest file updates for controlling video playback is disclosed.

Video streaming allows video content to be delivered to a video player via the internet. The video content is a video signal generated by a content provider for distribution to video consumers. The video signal may be provided in an uncompressed file format, such as a serial digital interface (SDI) format, or in a compressed format, such as a Moving Picture Experts Group (MPEG) file format or Transport Stream (TS) file format. The video signal is sent to an encoder which converts the file into a live streaming signal. The live streaming signal is preferably a segmented data stream that may be transmitted using standard Hypertext Transport Protocol (HTTP) over the internet. The live streaming signal may include multiple streams, where each stream may have a different data rate and/or different resolution.

Two common formats for the live streaming signal include HTTP Live Streaming (HLS) implemented by Apple® and MPEG-Dynamic Adaptive bitrate Streaming over HTTP (MPEG-DASH) implemented, for example, by web browsers such as Chrome®, Microsoft Edge®, and Firefox®. In addition to the segmented data stream, the encoder generates a manifest file. The manifest file contains information for a video player to play the segmented data stream such as the data rate and resolution of each stream and a playlist providing an address from which the video content may be retrieved. Historically, the encoder has generated a single manifest file for each encoded video signal, where the manifest file is distributed along with the streaming signal.

The live streaming signal and the manifest file are stored in one or more Content Delivery Networks (CDN). Each CDN includes a number of edge servers which store the streaming signal and manifest file until requested by a video player. When the streaming signal is provided to multiple CDNs, the CDNs may be in different geographic locations, such as the West Coast, East Coast, or Midwest. Each video player may select a CDN based, among other things, on its geographic proximity in order to reduce transmission latencies.

The video player may be any suitable electronic device to receive the streaming signal such as a desktop computer, a television, a laptop computer, a tablet, or a mobile phone. A user initiates a request to view desired video content on the video player. The video player includes video management software executing on the video player which has knowledge of the address of the CDN and which may provide a list of video content stored on the CDN to the user. After the user has selected a desired video, the video player, in turn, requests that the video content be transmitted from the CDN.

As is further known to those skilled in the art, it is often desirable to enforce logic rules for distribution of video content which may impact a user's experience. For example, it may be desirable to allow a user to view requested video content for a predetermined amount of time, such as 120 seconds, before then being required to view advertising or other alternative content. Also, it may be desirable to inhibit a user's ability to skip such alternative content if the user has already viewed a predetermined amount of the requested video content, or conversely, allow the user to skip the alternative content if the user has not viewed the predetermined amount of requested video content. Also, it may be desirable to allow a user to skip the alternative content if the user is seeking to go back and replay a previously viewed portion of the requested video content.

However, these logic rules for distribution of video content can be complex to implement and enforce, particularly given the variety of possible configurations that exist for video players. As a result, there is a need to improve the implementation of such logic rules across the widest variety of video players possible.

BRIEF DESCRIPTION OF THE DISCLOSURE

The subject matter disclosed herein describes an apparatus and method for managing video playback for users during video streaming. In one aspect, a server may be used to generate manifest files and updates to video players requesting video content. As a result, instead of relying on each video player to enforce logic rules for distribution of the video content, the manifest files and updates may be used to enforce the logic rules on a wider variety of video player configurations. In addition, the manifest files and updates may be provided unique to each video player. Consequently, the manifest files and updates may further provide customized user experiences despite the same video content being requested.

According to one embodiment of the present disclosure a system for managing video playback is disclosed. The system includes a manifest server configured to communicate with a video player and a content delivery network. The manifest server executes a program stored in a non-transient medium to receive a request from a video player for playing a video stream. Upon receiving the request, the manifest server communicates with a content delivery network to obtain a first manifest file containing information for allowing a video player to play the video stream. The manifest server modifies the first manifest file to produce a second manifest file unique to the video player having the request, where the second manifest file contains information for allowing the video player to play the video stream according to a rule that is added to the second manifest file.

According to other aspects of the disclosure, the rule may direct the video player to play alternative content in addition to playing the video stream. Optionally, the rule may direct the video player to play the alternative content before playing the video stream or the rule may direct the video player to play the alternative content after playing a predetermined amount of the video stream. According to still another option, the rule may inhibit the video player from skipping the alternative content.

According to still other aspects of the disclosure, the second manifest file may include a session identifier for identifying a connection between the manifest server and the video player having the request. The method may include modifying the second manifest file to produce an updated second manifest file unique to the video player having the request, where the updated second manifest file contains information for allowing the video player to play the video stream according to the rule and a second request from the video player. The second request may be to seek forward or backward in the video stream, and the manifest server may compare the second request to a view history of the video player to produce the updated second manifest file.

According to another embodiment of the disclosure, a method for managing video playback using a manifest server configured to communicate with a video player and a content delivery network is disclosed. The method receives a request from a video player for playing a video stream and upon receiving the request, communicates with a content delivery network to obtain a first manifest file containing information for allowing a video player to play the video stream. The first manifest file is modified to produce a second manifest file unique to the video player having the request, where the second manifest file contains information for allowing the video player to play the video stream according to a rule that is added to the second manifest file.

These and other objects, advantages, and features of the disclosure will become apparent to those skilled in the art from the detailed description and the accompanying drawings. It should be understood, however, that the detailed description and accompanying drawings, while indicating various embodiments of the present disclosure, are given by way of illustration and not of limitation. Many changes and modifications may be made within the scope of the present disclosure without departing from the spirit thereof, and the disclosure includes all such modifications.

BRIEF DESCRIPTION OF THE DRAWING(S)

Various embodiments of the subject matter disclosed herein are illustrated in the accompanying drawings in which like reference numerals represent like parts throughout, and in which:

FIG. 4 is a segment of a manifest file describing the bandwidths of the available streams for the streaming video content and the location of each stream according to one embodiment of the disclosure; and FIG. 5 is a segment of a manifest file including a portion of a playlist according to one embodiment of the disclosure.

Figure 1:
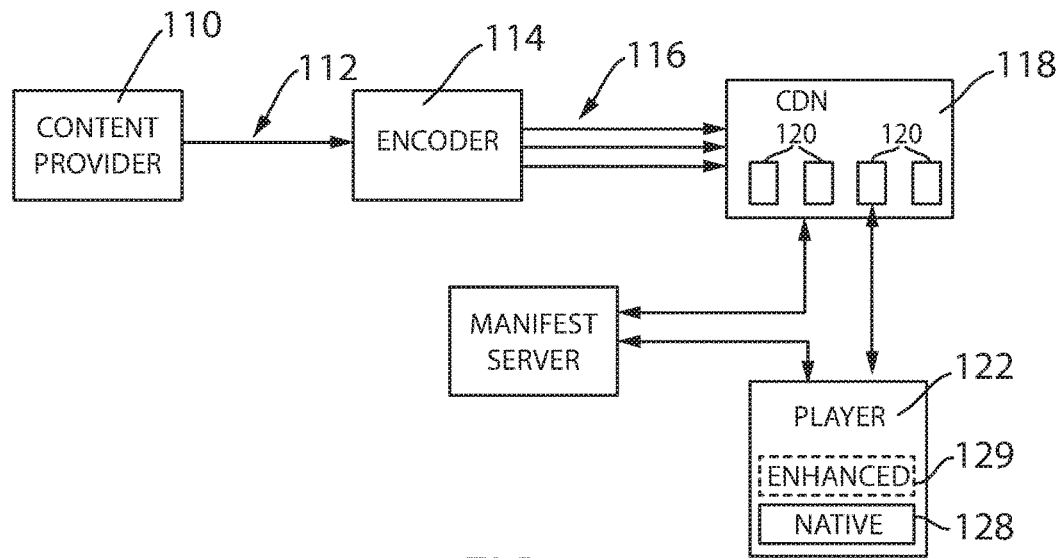
FIG. 1 is a block diagram representation of an environment incorporating the method for managing video playback using manifest files generated by a server of the present disclosure.

In describing the various embodiments of the disclosure which are illustrated in the drawings, specific terminology will be resorted to for the sake of clarity. However, it is not intended that the disclosure be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE DISCLOSURE

The various features and advantageous details of the subject matter disclosed herein are explained more fully with reference to the non-limiting embodiments described in detail in the following description.

Turning initially to FIG. 1, one environment for managing video playback using manifest files generated by a server is illustrated. A content provider 110 generates a video signal 112 to be distributed to video consumers. The video signal may be provided in an uncompressed file format, such as a SDI format, or in a compressed format, such as an MPEG or TS file format. The video signal 112 is sent to an encoder 114 which converts the file into a live streaming signal 116. The live streaming signal 116 is preferably a segmented data stream that may be transmitted using standard HTTP or HTTPS protocol over the internet. The live streaming signal 116 may include multiple streams, where each stream may have a different data rate and/or different resolution. The format of the live streaming signal may be, but is not limited to, HLS or MPEG-DASH. Still other protocols such as HTTP Dynamic Streaming (HDS) from Adobe® or Microsoft® Smooth Streaming and the like may be used without deviating from the scope of the disclosure.

In addition to the segmented data stream, the encoder generates a manifest file. The manifest file contains information for a video player 122 to play the segmented data stream such as the data rate and resolution of each stream and a playlist providing an address from which the video content may be retrieved. The encoder 114 generates a single manifest file for each encoded video signal, where the manifest file is distributed along with the streaming signal 116 and stored on a CDN 118. Each CDN 118 includes a number of edge servers 120 which store the encoded video signal 116 and manifest file until playback of the video content is requested by a video player 122. Although the embodiment illustrated in FIG. 1 shows a single CDN 118, it is contemplated that the encoded video signal 116 may be stored on multiple CDNs 118. The manifest file may include an address of each CDN such that playback may occur from any of the CDNs 118.

As further shown in FIG. 1, the illustrated environment includes a manifest server 124. The manifest server 124 is used to provide a unique manifest file, also referred to herein as a per-user manifest file, to each video player 122 for each requested video content. Each video player 122 includes a native video player module 128 which provides an interface to a user and which manages video playback on the video player 122. Some video players 122 may further include an enhanced video player module 129, illustrated as an optional module in FIG. 1. The enhanced video player module 129 may be a plug-in or other software module executing on the video player 122 that either complements (i.e., adds additional capabilities) or replaces (i.e., adds additional capabilities and incorporates the video interface and playback capabilities) the native video player module 128. As will be discussed in more detail below, when a user 125 requests video content for playback on the video player 122, the native or enhanced video player module 129 communicates with the manifest server 124 rather than the CDN 118 to obtain the manifest files for video playback. The manifest server 124 manages the retrieval and delivery of the manifest file generated by the encoder 114 to provide the unique manifest file to each video player 122.

Figure 2:
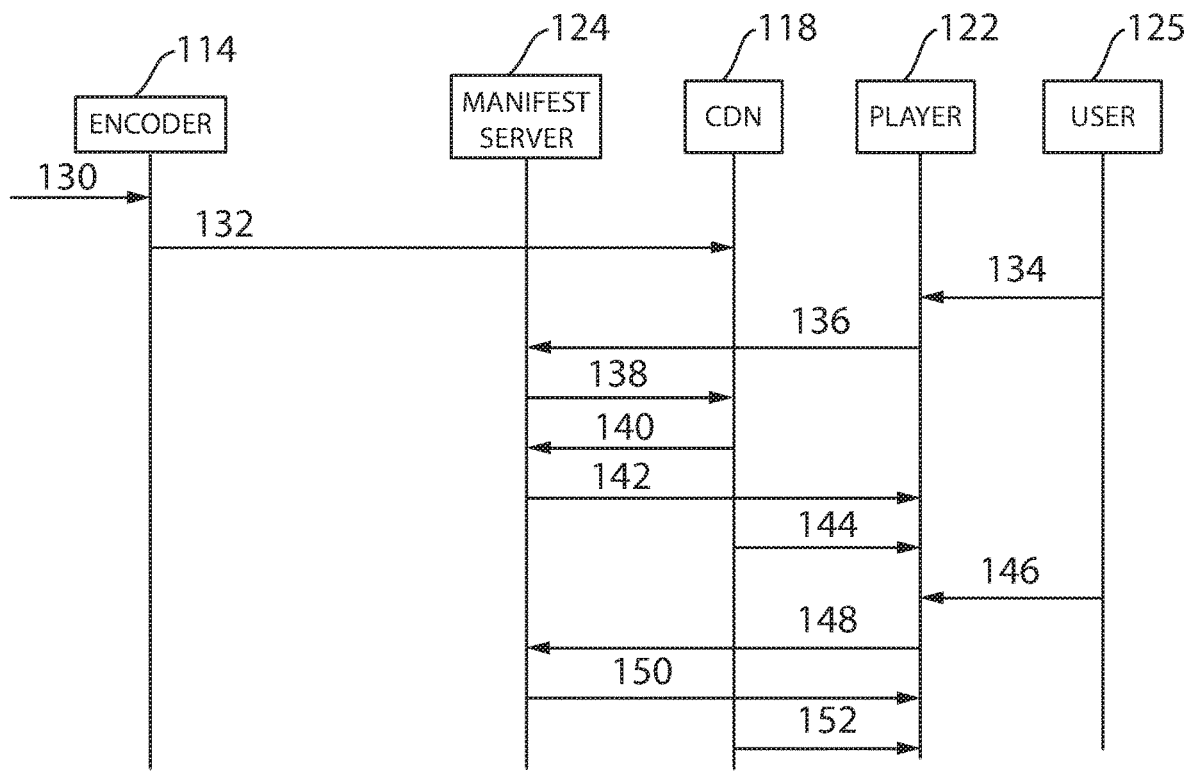
FIG. 2 is a flow diagram illustrating the managing of video playback using manifest files generated by a server according to one embodiment of the disclosure.
Figure 3A:
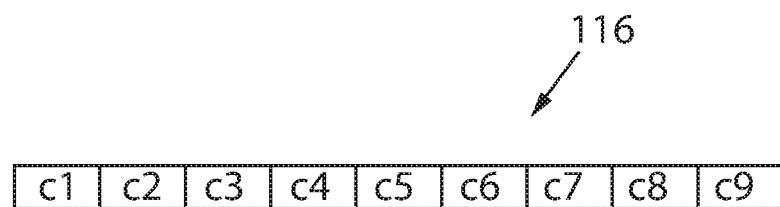
FIG. 3A is an exemplar video signal divided into video segments.

Turning next to FIG. 2, the operations performed to manage video playback using manifest files generated by a server are illustrated. At block 130, the encoder 114 receives the initial video signal 112. It is contemplated that this video signal 112 may be a pre-recorded signal, such as an episode of a television show or a movie, or the video signal 112 may be a live stream, for example, of a sporting event, concert, or news feed. The encoder 114 converts the original video signal into a live streaming signal 116 suitable for delivery via HTTP or HTTPS. One operation in converting the video signal is to divide the video signal into segments. The segments may be, for example, 10 seconds in length. Optionally, other segment lengths, for example, from 1 second up to 10 seconds may be selected. The length of the video segment must be less than the maximum payload for an HTTP data packet. Referring briefly to FIG. 3A, a video signal 116 from the encoder 114, shown by way of example, may consist of video content being divided into nine segments of requested video content, illustrated as "c1," "c2," "c3," and so forth, with each segment being 10 seconds in length for a net content length of 90 seconds. After generating the video signal 116 into segments (also referred to as requested video content), the video signal and a manifest file are transmitted to the CDN 118 for storage in one of the edge servers 120, as shown in block 132.

At block 134, a user 125 then requests playback of a desired video segment on the video player 122. The video player 122 may be any suitable electronic device to receive the streaming signal 116 such as a desktop computer, a television, a laptop computer, a tablet, Wi-Fi enabled device connected to a video screen, or a mobile phone. At block 136, the video player 122, in turn, requests a manifest file from the manifest server 124 in order to retrieve the information necessary to play the requested video content. With reference also to FIGS. 4 and 5, segments of manifest files are illustrated that demonstrate a portion of the content that may be available in a manifest file. The manifest file is a text file and the particular content on each line of the text file is identified by the directive at the start of the line. For example, FIG. 4 identifies four different streams in the streaming signal 116 where each stream has a different bandwidth. The location of a playlist for each of the streams is also included in the manifest file. FIG. 5 is another manifest file which contains a portion of the playlist of an encrypted video segment. Each line may identify a particular video segment between 1 and 5 (i.e., the "-1", "-2", etc. . . . prior to the .ts file extension), and provides the location of video segment in the CDN 118. The manifest file may include any information corresponding to the video stream, such as metadata information for the video stream.

When the video player 122 requests the manifest file from the manifest server 124 a connection is established between the devices. A session identifier is also generated to identify the connection. The session identifier may be generated by the video player 122 or the manifest server 124. For purposes of illustration, it will be assumed that the session identifier is generated by the video player 122. The session identifier is transmitted to the manifest server 124 by the video player 122 when requesting a manifest file. The manifest server 124 then requests the manifest file from the CDN 118 at block 138. At block 140, the CDN 118 returns the manifest file to the manifest server 124.

Because the manifest server 124 has established a connection with video player 122, it may customize the manifest file prior to returning the manifest file to the video player 122 and provide a unique manifest file to each video player 122. Without the manifest server 124, the video player 122 retrieves the manifest file directly from the CDN 118 and the content of the manifest file is the same for all users. However, because the manifest server 124 is providing a unique manifest file to each player, the manifest file may include identifying information of the video player 122, the user 125 of the video player, or a combination thereof. Further, the manifest file may be modified to include content specific for the user 125.

According to one embodiment of the disclosure, the manifest server 124 is configured to generate a unique per-user manifest file (and updates) for the video player 122. The manifest file from the manifest server 124 may reflect logic rules which may be desirable to enforce for distribution of the video content to the user 125. For example, a video manifest file may be modified by the manifest server 124 to enforce logic rules requiring viewing alternative content, such as commercial advertisements, at the video player 122 at a very start of the streaming signal 116, or logic rules requiring inhibiting an ability of the user 125 to skip such alternative content if the user 125 has already viewed a predetermined amount of the streaming signal 116, or conversely, logic rules allowing the user 125 to skip the alternative content if the user 125 has not viewed the predetermined amount of the streaming signal 116. Accordingly, the manifest server 124 may generate a customized manifest file for the video player 122 which stitches together requested video content and alternative content into a single video stream according to predetermined logic rules desired to be enforced.

Figure 3B:
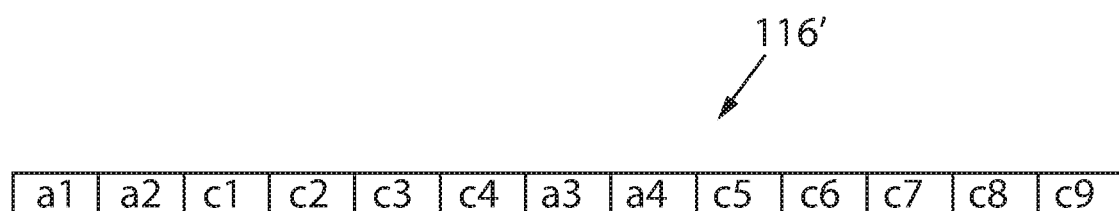
FIG. 3B is a modified video signal stitched to include alternative content segments.

For example, referring briefly to FIG. 3B, with the customized manifest server generated, the video signal 116 may be reconfigured for playback as a modified video signal 116' including two segments of alternative content, illustrated as "a1" and "a2, followed by four segments of requested video content, illustrated as "c1," "c2, "c3" and "c4, followed by another two segments of alternative content, illustrated as "a2" and "a3, and followed by another four segments of requested video content, illustrated as "c5," "c6, "c7" and "c8." With segments being 10 seconds in length, the modified video signal 116' may then have a gross content length of 130 seconds. This stitched video stream may reflect, for example, enforcement of a logic rule by the manifest server 124 requiring initial viewing of a first advertisement and a midstream viewing of a second advertisement for a first time viewing of the requested video content at the video player 122. Each time the user 125 plays a video, the video player 122 may obtain an updated manifest file from the manifest server 124. The manifest server 124 may individually track a status of the video player 122 and the user view experiences. At block 142, the manifest server 124 transmits the manifest file to the video player 122.

Referring again to FIG. 1, if the video player 122 includes an enhanced video player module 129 from the provider of the manifest server 124, the enhanced video player module 129 may be configured to store the view history of the user 125 on the video player 122 for providing to the manifest server 124. The enhanced video player module 129 may store and provide, for example, which alternative content the user 125 has viewed, total content time the user 125 has viewed, total alternative content time the user 125 has viewed, a listing of the requested content and alternative content the user 125 has viewed by segment, and so forth. If the video player 122 does not have an enhanced video player module 129, then the manifest server 124 may seek to record such view history directly.

The manifest server 124 may use the view history to enforce logic rules for each video player. For example, logic rules may require a first amount of alternative content, such as advertisement, be viewed by users at a first subscription level and may require a second amount of alternative content be viewed by users at a second subscription level. When the video player 122 establishes a connection with the manifest server 124, the appropriate logic rules for the connection are determined based, for example, on a user name or device identification provided from the video player to the manifest server. The video player 122 is unable to distinguish between alternative content and the requested content based on the playlist provided in the manifest file. Therefore, the manifest server updates the playlist in the manifest file to enforce the logic rules associated with each connection.

Having received the manifest file from the manifest server 124, at block 144, either the enhanced video player module 129 or the native video player module 128 executes the modified video signal 116' in a single video stream. The manifest file will have the address of the CDN 118 as containing the segmented video content. Therefore, the video player 122 can start retrieving the video content from the CDN. The video player 122 repeatedly requests the next segment in the playlist from the CDN 118 and the CDN 118 returns the requested segment according to the modified video signal 116'.

Referring again to FIG. 2, according to another aspect of the disclosure, at block 146, the user 125 may wish to seek forward or backward when viewing the modified video signal 116', such as to view a specific requested video content segment or to skip viewing alternative content stitched into the playlist. Accordingly, instead of the video player 122 seeking forward or backward to a requested video content segment in accordance with the user's request, at block 148, the video player 122 redirects the user's request to the manifest server 124. The manifest server 124, in turn, may consider the logic rules to be enforced based on the requested video content and/or the view history on the video player 122. At block 150, the manifest server 124 may deliver an updated manifest file to the video player 122 responsive to the user's request while within the limits of the logic rules to be enforced. Then, at block 152, either the enhanced video player module 129 or the native video player module 128 proceeds to execute according to the updated manifest file in a single video stream via the CDN 118.

Figure 3C:
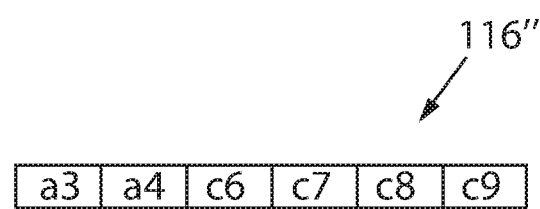
FIG. 3C is a second modified video signal (updated) stitched to include alternative content segments upon a user request to seek forward or backward, each according to an embodiment of the disclosure.

For example, referring briefly to FIGS. 3A-3C, the user has requested the video signal 116 for playback on the video player 122. The logic rules in the manifest server 124 may require the alternative content, such as commercial advertising, a1-a4 be inserted within the video stream provided to the video player 122. The video player 122, therefore, receives a custom manifest file with a playlist for a modified video signal 116' including a1, a2, a3, and a4 inserted. At the beginning of the playback of the modified video stream 116', the user may try to skip a portion or all of the commercial advertisements (a1, a2) by initiating a seek forward request on the video player 122. The enhanced video player module 129 redirects the seek forward request to the manifest server 124. Upon the video player 122 redirecting a user's request to seek forward or backward in the modified video signal 116', for example, to video content segment "c6," the manifest server 124 may consider the logic rules and/or view history on the video player 122 associated with the particular connection. If the user has satisfied the required rules for viewing alternative content, the manifest file returns a playlist starting at segment "c6" and allows the user to continue viewing from segment "c6". If, however, the user has not satisfied the logic rules, the manifest server 124 provides a manifest file including alternative content, such as a3 and a4 prior to viewing "c6". The video player 122 then begins playback of the new alternative content requiring the user 125 to view alternative content before viewing the video content segment "c6." As a result, the manifest server 124 delivers a second modified video signal 116" (i.e., an updated playlist in a manifest file) to the video player 122 responsive to the user's request, but enforcing a logic rule, and thereby requiring the user 125 to first view two segments of alternative content, illustrated as "a3" and "a4," before viewing the sought content segment "c6."

Optionally, the manifest server 124 may enforce logic rules by inhibiting seek operations. For example, if the logic rules require viewing of two alternative content segments (e.g., a1, a2) prior to viewing requested video content, the initial playlist in the manifest file may add the two alternative content segments at the beginning as shown in the modified video stream 116'. If a user initiates a seek forward operation, the enhanced video player module 129 again transmits the request to the manifest server 124. The manifest server 124 may discard or ignore the seek forward operation until the view history indicated that the required alternative content has been viewed. It is, therefore, one aspect of the disclosure that a server-side assisted method may be used to enforce logic rules for video view experiences by enforcing such rules in video manifest files delivered to video players. Individual video manifest files may be updated to enforce such rules unique to each video player as desired.

According to another aspect of the disclosure, the manifest server 124 may record a user's viewing history from multiple devices to enforce the logic rules. For example, a user may begin watching a requested video stream 116 on a first video player 122. The manifest server 124 generates the per-user manifest file including a playlist for the modified video stream 116' according to the logic rules associated with the user. The manifest server 124 records the view history from the first video player 122 associated with the user and the requested video stream 116. The user may stop viewing the video stream 116 on the first device and later resume watching the video stream 116 on a second video player 122. If both video players are associated with the user, the manifest server 124 has the view history of the user stored and may begin playback on the second video player 122 according to the logic rules and the prior viewing history. Thus, a server-side assisted device hand over may allow hand over video status and/or user status information from one device to another device. When a user hands over video playback from one device to another device, such as from a smart phone to a television, the viewing history and associated user experiences may transfer to the other device.

In one aspect of the disclosure, a server-side assisted method may be used to enforce logic rules for video view experiences by enforcing such rules in video manifest files delivered to video players. Individual video manifest files may be updated to enforce such rules unique to each video player as desired.

According to another aspect of the disclosure, a video manifest file may be modified by a server to include video segments which video viewing logic rules dictate. For example, logic rules may dictate modifying the manifest file to insert alternative content, such as commercial advertisements, at a very start of the video stream. Each time a user plays a video, the video player may obtain an updated manifest file from the server. The server may individually track the status of video players and their user view experiences, such as for how much time a current video may have been played by a user, among other things.

According to another aspect of the disclosure, video seek operations may be performed per-user via a manifest file delivery service provided by a server which returns manifest files to users enforcing logic rules which do not allow skipping of alternative content. As a result, if a user seeks to advance forward or backward in video stream, instead of the video player seeking forward or backward, the video player may request a manifest file update from the server.

According to another aspect of the disclosure, a software layer may be provided for the video player to provide, among other things, video content length, current play position, and location of alternative content, when a corresponding manifest file does not contain one or more of such segments. This may hide complexity in total length computations and accurate seek position determinations in the event that a manifest file contains only partial segments. In one aspect, content length may include strictly requested video content and not alternative content.

According to another aspect of the disclosure, a server side assisted device hand over may be provided to hand over video status and/or user status information from one device to another device. A per-user device manipulator may keep track of user status and/or video status, and when a user hands over video streaming from one device to another device, such as from a smart phone to a media player connected to a television, all user experiences may also transfer to the other device.

Portions of the disclosed embodiment are described herein as being implemented on various physical devices, including, but not limited to the video player 122, the manifest server 124, the encoder 114, or the edge server 120 within a CDN 118. It would be understood by one skilled in the art that these devices may include processing devices, such as a single microprocessor, multiple microprocessors, co-processors, application specific integrated circuits (ASICs), or multiple computing devices operating separately, in tandem, or a combination thereof. Further, each of these devices includes storage which may be include transitory storage, non-transitory storage, or a combination thereof. The storage may include memory devices such as random access memory (RAM), read-only memory (ROM), solid state memory, and the like. The storage may further include devices configured to read removable storage medium such as CD-ROMs, DVDs, floppy disks, universal serial bus (USB) devices, memory cards, and the like. The processing devices may be configured to read and execute instructions stored in non-transitory storage to perform various operations in the methods described herein.

It should be understood that the disclosure is not limited in its application to the details of construction and arrangements of the components set forth herein. The disclosure is capable of other embodiments and of being practiced or carried out in various ways. Variations and modifications of the foregoing are within the scope of the present disclosure. It also being understood that the technology disclosed and defined herein extends to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure.

What is claimed is:

1. A system for managing video playback comprising:
a manifest server configured to communicate with a plurality of video players and a content delivery network (CDN), the manifest server to:
(a) receive a request from a first video player of the plurality of video players for playing a video stream, wherein the video stream is associated with a first manifest file for the video stream and distributed to the CDN along with the video stream;
(b) upon receiving the request, communicate with the CDN to request, from the CDN, the first manifest file previously stored at the CDN, the first manifest file containing information to allow any of the plurality of video players to play the video stream;
(c) receive the first manifest file from the CDN;
(d) modify the first manifest file previously stored at and received from the CDN to produce a second manifest file unique to the first video player having the request, wherein to modify the first manifest file to produce the second manifest file unique to the first video player, the manifest server is further to:
determine at least one rule associated with a connection between the manifest server and the first video player,
determine a view history of a user of the first video player, the view history comprising an indication of a total viewing time of the user with respect to the video stream, and an indication of a total viewing time of the user with respect to alternative content, and
modify a playlist of the first manifest file to specify a combination of segments of the video stream and segments of the alternative content in a modified video stream, wherein a number of segments of the alternative content is added to the segments of the video stream in the combination in accordance with the rule and the view history comprising the indication of the total viewing time of the user with respect to the video stream, and the indication of the total viewing time of the user with respect to the alternative content,
(e) transmit the second manifest file to the first video player, the second manifest file including the modified playlist to allow the first video player to play the combination of segments of the video stream and the segments of alternative content in the modified video stream according to the rule and the view history of the user of the first video player; and
(f) in response to a second request of the user with respect to the modified video stream, create an updated second manifest file based on (i) the rule associated with the connection between the manifest server and the first video player and (ii) recent view history of the user.

2. The system of claim 1, wherein the rule directs the first video player to play the alternative content in addition to playing the video stream.

3. The system of claim 2, wherein the rule directs the first video player to play one or more segments of the alternative content before playing the video stream, in accordance with the view history comprising the indication of the total viewing time of the user with respect to the alternative content.

4. The system of claim 2, wherein the rule directs the first video player to play the alternative content after playing a predetermined amount of the video stream.

5. The system of claim 2, wherein the rule inhibits the first video player from skipping the alternative content.

6. The system of claim 1, wherein the second manifest file includes a session identifier for identifying the connection between the manifest server and the first video player.

7. The system of claim 1, wherein the updated second manifest file contains information to allow the first video player to play the modified video stream according to the rule and the second request from the first video player.

8. The system of claim 7, wherein the second request is to seek forward or backward in the video stream.

9. The system of claim 7, wherein the manifest server compares the second request to the view history of the user of the first video player to produce the updated second manifest file.

10. The system of claim 1, wherein the playlist provides an address at which the video stream is to be retrieved and at least one of a data rate or a resolution for the video stream.

11. A method for managing video playback using a manifest server configured to communicate with a plurality of video players and a content delivery network (CDN), the method comprising:
  (a) receiving a request from a first video player of the plurality of video players for playing a video stream, wherein the video stream is associated with a first manifest file for the video stream and distributed to the CDN along with the video stream;
  (b) upon receiving the request, communicating with the CDN to request, from the CDN, the first manifest file previously stored at the CDN, the first manifest file containing information to allow any of the plurality of video players to play the video stream;
  (c) receiving the first manifest file from the CDN;
  (d) modifying the first manifest file previously stored at and received from the CDN to produce a second manifest file unique to the first video player having the request,
  wherein modifying the first manifest file to produce the second manifest file unique to the first video player comprises:
    determining at least one rule associated with a connection between the manifest server and the first video player,
    determining a view history of a user of the first video player, the view history comprising an indication of a total viewing time of the user with respect to the video stream, and an indication of a total viewing time of the user with respect to alternative content, and
    modifying a playlist of the first manifest file to specify a combination of segments of the video stream and segments of the alternative content in a modified video stream, wherein a number of segments of the alternative content is added to the segments of the video stream in the combination in accordance with the rule and the view history comprising the indication of the total viewing time of the user with respect to the video stream, and the indication of the total viewing time of the user with respect to the alternative content,
  (e) transmitting the second manifest file to the first video player, the second manifest file including the modified playlist to allow the first video player to play the combination of segments of the video stream and the segments of alternative content in the modified video stream according to the rule and the view history of the user of the first video player; and
  (f) in response to a second request of the user with respect to the modified video stream, creating an updated second manifest file based on (i) the rule associated with the connection between the manifest server and the first video player and (ii) recent view history of the user.

12. The method of claim 11, wherein the rule directs the first video player to play the alternative content in addition to playing the video stream.

13. The method of claim 12, wherein the rule directs the first video player to play one or more segments of the alternative content before playing the video stream or after playing a predetermined amount of the video stream, in accordance with the view history the view history comprising the indication of the total viewing time of the user with respect to the alternative content.

14. The method of claim 12, wherein the rule inhibits the first video player from skipping the alternative content.

15. The method of claim 11, wherein the second manifest file includes a session identifier for identifying the connection between the manifest server and the first video player.

16. The method of claim 11, wherein the second request is to seek forward or backward in the video stream.

17. The method of claim 11, wherein the playlist provides an address at which the video stream is to be retrieved and at least one of a data rate or a resolution for the video stream.

18. A non-transitory computer-readable medium comprising instructions, which when executed by a processor, cause the processor to perform a method to manage video playback using a manifest server configured to communicate with a plurality of video players and a content delivery network (CDN), the method comprising:
  (a) receiving a request from a first video player of the plurality of video players for playing a video stream, wherein the video stream is associated with a first manifest file for the video stream and distributed to the CDN along with the video stream;
  (b) upon receiving the request, communicating with the CDN to request, from the CDN, the first manifest file previously stored at the CDN, the first manifest file containing information to allow any of the plurality of video players to play the video stream;
  (c) receiving the first manifest file from the CDN;
  (d) modifying the first manifest file previously stored at and received from the CDN to produce a second manifest file unique to the first video player having the request,
  wherein modifying the first manifest file to produce the second manifest file unique to the first video player comprises:
    determining at least one rule associated with a connection between the manifest server and the first video player,
    determining a view history of a user of the first video player, the view history comprising an indication of a total viewing time of the user with respect to the video stream, and an indication of a total viewing time of the user with respect to alternative content, and
    modifying a playlist of the first manifest file to specify a combination of segments of the video stream and segments of the alternative content in a modified video stream, wherein a number of segments of the alternative content is added to the segments of the video stream in the combination in accordance with the rule and the view history comprising the indication of the total viewing time of the user with respect to the video stream, and the indication of the total viewing time of the user with respect to the alternative content, (e) transmitting the second manifest file to the first video player, the second manifest file including the modified playlist to allow the first video player to play the combination of segments of the video stream and the segments of alternative content in the modified video stream according to the rule and the view history of the user of the first video player; and (f) in response to a second request of the user with respect to the modified video stream, creating an updated second manifest file based on (i) the rule associated with the connection between the manifest server and the first video player and (ii) recent view history of the user.

19. The non-transitory computer-readable medium of claim 18, wherein the rule directs the first video player to play the alternative content in addition to playing the video stream.

20. The non-transitory computer-readable medium of claim 18, wherein the rule directs the first video player to play one or more segments of the alternative content before playing the video stream or after playing a predetermined amount of the video stream, in accordance with the view history the view history identifying which alternative content the user has viewed and comprising the indication of the total viewing time of the user with respect to the alternative content.

* * * * *